United States Patent
Rable (10) Patent No.: US 7,331,518 B2
(45) Date of Patent: Feb. 19, 2008

(54) TRANSACTION PROCESSING SYSTEMS AND METHODS

(75) Inventor: Greg Rable, Marietta, GA (US)

(73) Assignee: FactorTrust, Inc., Atlanta, GA (US)

( * ) Notice: Subject to any disclaimer, the term of this patent is extended or adjusted under 35 U.S.C. 154(b) by 0 days.

(21) Appl. No.: 11/278,612

(22) Filed: Apr. 4, 2006

(65) Prior Publication Data

US 2007/0228148 A1 Oct. 4, 2007

(51) Int. Cl.
*G06K 5/00* (2006.01)
(52) U.S. Cl. .................. 235/380; 705/39; 705/40; 705/44
(58) Field of Classification Search ........... 235/380; 705/39, 40, 44, 35, 36, 37, 38, 41, 42, 43, 705/45; 455/558
See application file for complete search history.

(56) References Cited

U.S. PATENT DOCUMENTS

| 2002/0035539 | A1  | 3/2002  | O'Connell       |         |
|--------------|-----|---------|-----------------|---------|
| 2002/0099648 | A1* | 7/2002  | DeVoe et al.    | 705/38  |
| 2003/0162565 | A1* | 8/2003  | Al-Khaja        | 455/558 |
| 2005/0108178 | A1* | 5/2005  | York            | 705/75  |
| 2005/0240418 | A1  | 10/2005 | Chappuis        |         |
| 2006/0016878 | A1  | 1/2006  | Singer et al.   |         |

OTHER PUBLICATIONS

Forgetmenot Software Limited, SMS Authentication of Credit Card Transactions for Financial Institutions, Retrieved Apr. 12, 2006 from Internet Site http://www.fmnsoft.com/whitepapers/The%20use%20of%20SMS%20in%20Credit%20Card%Overification.pdf, pp. 1-2, ForgetMeNot Software Limited.
Manoj Kumar, Chargeback Insurance, A Risk Management Perspective, Retrieved Apr. 12, 2006 from Internet Site http://www.comtrust.ae/docs/ppt/Oman_Insurance.pps, pp. 1-38, Oman Insurance.
The Green Sheet, Inc., Visa/Mastercard Merchant Chargeback Insurance Has paid 100% of Claims, Retrieved Apr. 7, 2006 from Internet Site http://www.greensheet.com/PriorIssues-/961101-/961101-6.html, pp. 1-2, The Green Sheet, Inc.
COMTRUST, Our Alliances, Retrieved Apr. 7, 2006 from Internet Site http://www.comstrust.co.ae/docs/alliances.htm, pp. 1-2, Comtrust.
International Search Report from PCT/US2006/14477, dated Sep. 14, 2006.

* cited by examiner

*Primary Examiner*—Daniel Hess
(74) *Attorney, Agent, or Firm*—Alston & Bird, LLP (57) ABSTRACT

A transaction processing system according to various embodiments of the invention is adapted for: (1) associating a particular account (e.g., a credit card account) with a particular phone number; (2) at least partially in response to receiving a request to approve a transaction associated with the account, automatically transmitting a message (e.g., a text message) to the account holder via the phone number, requesting that the account holder confirm that the transaction is valid; and (3) using a response to the message to determine whether to approve or deny the transaction. In various embodiments, the request confirmation message requests that that the user answer a particular question (e.g., regarding out-of-wallet data), and the system is adapted to determine whether to approve or deny the transaction based on whether the response included a correct answer to the question.

35 Claims, 8 Drawing Sheets

Acme Online Purchase:

Your credit card was charged $32.45 at Acme.com on 01/12/2006. Do you approve this purchase?

To approve this transaction, enter "1". To decline the transaction, enter "2".

Thank you for shopping Acme Online!
Questions? Call us at (555) 555-1212

TRANSACTION PROCESSING SYSTEMS AND METHODS

BACKGROUND OF THE INVENTION

Monetary transactions, such as on-line purchases of goods or services, often involve a certain level of risk because it is often difficult to determine whether a payment mechanism (such as a payment via a credit card or a transfer of funds from a bank account) has been authorized by the appropriate individual. For example, for on-line purchases made via a credit card, because the merchant is typically not able to see the credit card being used to make the purchase or the individual conducting the transaction, it may be difficult to determine whether the transaction is being made properly by the cardholder, or improperly by another individual who is in possession of the cardholder's account information. Accordingly, there is a need for improved systems and processes for facilitating safe financial transactions (e.g., via the Internet).

SUMMARY OF VARIOUS EMBODIMENTS OF THE INVENTION

Various exemplary systems according to particular embodiments of the invention are summarized below. However, it should be understood that various embodiments of the invention also include computer-readable media for storing computer-executable instructions for executing any of the sequences of steps listed below. Similarly, various embodiments of the invention also include methods of executing any of the sequences of steps listed below. A transaction processing system according to various embodiments of the invention comprises: (1) a computer processor; and (2) memory for storing computer-readable instructions to be executed by the computer processor. In particular embodiments, the transaction processing system is adapted for: (1) receiving transaction information related to a particular transaction associated with a particular account of a particular account holder; (2) receiving, from a third party, account holder information related to the account holder; (3) at least partially in response to receiving the transaction information, transmitting a message to an electronic device (e.g., a cellular phone or personal computer) associated with the account holder, the message requesting a response indicating knowledge of the account holder information; (4) at least partially in response to receiving an account holder response, from the electronic device, indicating knowledge of the account holder information, communicating (e.g., to a merchant computer) that the transaction should be approved; and (5) at least partially in response to receiving an account holder response, from the electronic device, indicating a lack of knowledge of the account holder information, communicating (e.g., to a merchant computer) that the transaction should be denied.

A transaction processing system according to further embodiments of the invention is adapted for: (1) associating a particular account with a particular phone number, the account being associated with a particular account holder; (2) at least partially in response to receiving a request to approve a transaction associated with the account, automatically transmitting a message to the account holder, via the phone number, the message requesting that the account holder confirm that the transaction is valid; (3) using a response to the message to determine whether to approve or deny the transaction; (4) in response to determining to approve the transaction, approving the transaction; and (5) in response to determining to deny the transaction, denying the transaction.

A transaction processing system according to yet another embodiment of the invention is adapted for: (1) receiving an order from a customer; (2) receiving an indication that the customer wishes to pay for the order using a particular account; (3) determining whether the particular account has been enrolled in a particular order confirmation plan; (4) at least partially in response to determining that the particular account has been enrolled in the particular order confirmation plan: (a) identifying a phone number that has been associated with the particular account; (b) automatically transmitting a message to the account holder, via the phone number, requesting that the account holder confirm the order; (c) using a response to the message to determine whether to approve or deny payment for the order; (d) in response to determining to approve payment for the order, approving payment for the order; and (e) in response to determining to deny payment for the order, denying payment for the order. In various embodiments, the system is further configured for, at least partially in response to determining that the particular account has not been enrolled in the particular order confirmation plan, approving payment for the order without requesting that the account holder confirm the order.

A transaction processing system according to a further embodiment of the invention is adapted for: (1) receiving transaction information related to a particular transaction, the particular transaction being associated with a particular account of a particular account holder; (2) at least partially in response to receiving the transaction information, transmitting a message to an electronic device associated with a designated transaction approver, the message requesting approval of the transaction; (3) at least partially in response to receiving a response, from the transaction approver, indicating that the transaction should be approved, approving the transaction; and (4) at least partially in response to receiving a response, from the transaction approver, indicating that the transaction should be denied, denying the transaction. In various embodiments, the designated transaction approver is someone other than the account holder.

A transaction processing system according to a further embodiment of the invention is adapted for: (1) transmitting a transaction confirmation message to an electronic device to confirm a particular transaction; (2) receiving a response to the transaction confirmation message from the electronic device; and (3) assigning a transaction risk rating to the particular transaction based, at least in part, on at least one factor selected from a group consisting of: (A) a geographical location associated with the electronic device; and (B) the response to the transaction confirmation message.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF VARIOUS EMBODIMENTS OF THE INVENTION

The present invention now will be described more fully with reference to the accompanying drawings, in which some, but not all embodiments of the invention are shown. Indeed, this invention may be embodied in many different forms and should not be construed as limited to the embodiments set forth herein. Rather, these embodiments are provided so that this disclosure will satisfy applicable legal requirements. Like numbers refer to like elements throughout.

Overview

A transaction processing system according to various embodiments of the invention is adapted to allow an account holder (or other user) to set up a membership with a transaction confirmation service. In doing so, the account holder may provide the system with various information such as information regarding a particular account (e.g., an account number associated with a credit card, debit card, or bank account). The account holder may further provide the system with mobile electronic device contact information (e.g., a cell phone number), that the system may use to automatically confirm certain requested transactions associated with the particular account. In various embodiments, such transactions include, for example, paying for a purchase using funds from a particular account, making a change to the status of the particular account, and transferring funds to or from the particular account.

In addition, the account holder may provide information regarding the circumstances under which transactions made via the specified account should be personally confirmed by the account holder or another designated individual. For example, the account holder may specify that any requested transaction over $100.00 (or any transaction made at a certain type of merchant) involving the account should be personally confirmed by the account holder (or, alternatively, a designated individual other than the card holder—especially if the card holder is of high school or college age).

Furthermore, when setting up the membership, the account holder may optionally indicate the type of confirmation that should be required to personally confirm each transaction (or transactions satisfying certain specified criteria). For example, in one embodiment, the account holder may specify that they wish to confirm most transactions by simply pressing a certain key (e.g., a "yes" key) on account holder's cell phone in response to receiving a "request for confirmation" SMS message on the account holder's cell phone. However, the card holder may further specify that they wish to confirm purchase transactions over a certain amount (e.g., over $100) by answering one or more questions regarding: (1) "out of wallet" data associated with the account holder; (2) "in-wallet" data associated with the account holder; and/or (3) any other appropriate data associated with the account holder or the account. This may provide an additional layer of security in confirming these transactions.

In various embodiments, once a membership is set up, if a purchase transaction is paid for using the specified account at a participating merchant (e.g., a retailer participating in the transaction confirmation service), the merchant's computer system sends details of the transaction to a Transaction Confirmation Server associated with the transaction confirmation service. The Transaction Confirmation Server then contacts the account holder in the manner specified by the account holder when the account holder sets up their membership with the transaction confirmation service. For example, the system may transmit a "request confirmation" SMS message to the account holder's cellular phone.

If the Transaction Confirmation Server receives a response from the account holder indicating that the account holder confirms the transaction, the Transaction Confirmation Server sends a message to the merchant's computer system indicating that the user has personally confirmed the transaction. The merchant's computer system then typically approves and processes the transaction.

If the Transaction Confirmation Server does not receive a response from the account holder indicating that the account holder confirms the transaction, the Transaction Confirmation Server sends a message to the merchant's computer system indicating that the account holder has not personally confirmed the transaction. The merchant computer may then, for example, deny the transaction, or attempt to confirm the transaction in another manner (e.g., by having a customer service representative contact the account holder) before determining whether to approve or deny the transaction.

In various embodiments, the system may be adapted to follow a transaction confirmation process similar to the one described above to confirm transactions other than purchase transactions. Such transactions may include, for example, the transfer of money from or to a particular account, or the setup of a new account. The structure and operation of various transaction processing systems and methods are described in greater detail below.

In particular embodiments, the system may be adapted to allow one or more individual merchants (or other entities) to specify the circumstances under which particular transactions with the merchant, or other entity (e.g., transactions involving accounts registered with a particular transaction confirmation service) should be personally confirmed by the account holder or another designated individual. For example, a merchant may specify that any requested purchase transaction with the merchant in an amount over $100.00 involving accounts registered with the transaction confirmation service should be personally confirmed by the account holder (or, alternatively, a designated individual other than the card holder—especially if the card holder is of high school or college age). Furthermore, in various embodiments, the merchant (or other entity) may optionally indicate the type of confirmation that should be required to personally confirm each transaction (or transactions satisfying certain specified criteria). The system may be further configured to automatically facilitate confirmation of transactions according to the particular criteria specified by the merchant (or other entity) as described herein.

Structure of an Exemplary Transaction Processing System

Figure 1:
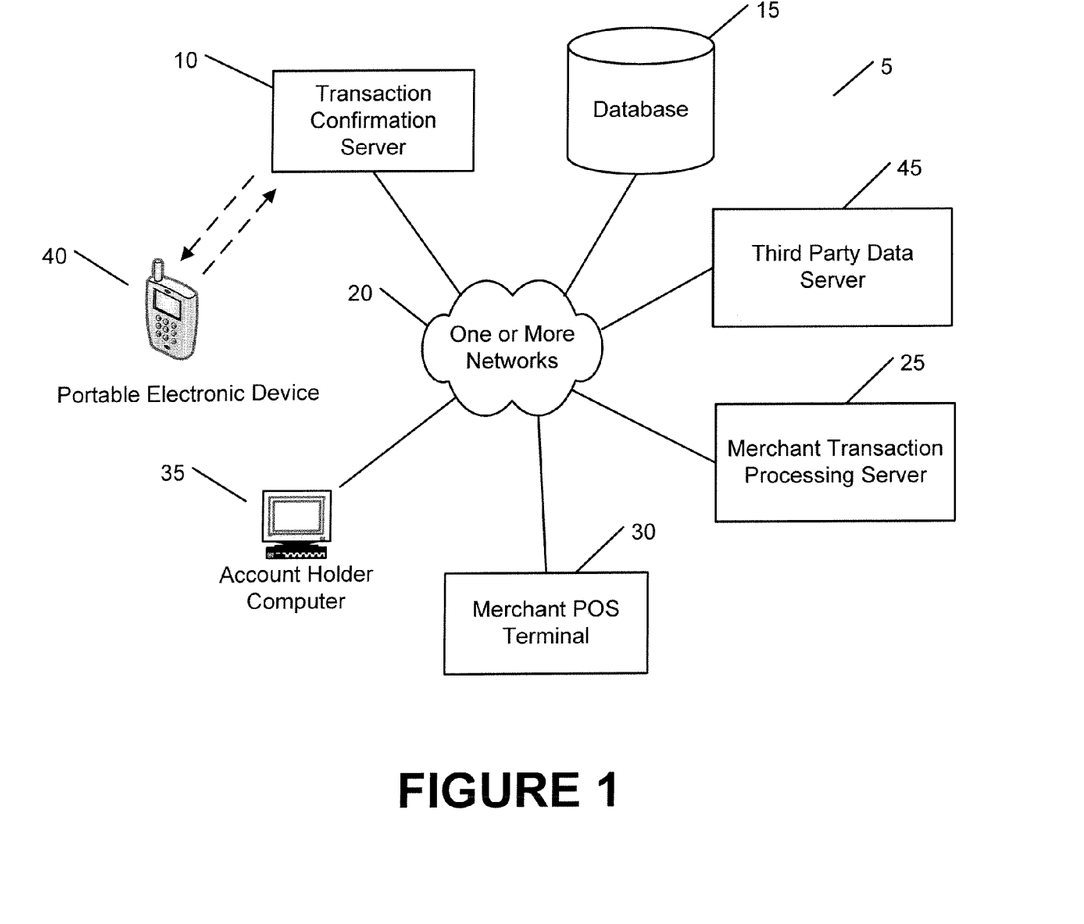
FIG. 1 is a block diagram of a Transaction Processing System according to a particular embodiment of the invention.

A transaction processing system 5 according to one embodiment of the invention is shown in FIG. 1. As may be understood from this figure, in this embodiment, the system 5 includes at least one: (1) Transaction Confirmation Server 10; (2) Merchant Transaction Processing Server 25; (3) Merchant POS Terminal 30; (4) Account Holder Computer 35; and/or (5) Third Party Data Server 45. As may be understood from FIG. 1, in various embodiments, the system 5 further includes one or more networks 20, such as a LAN or a global communications network (e.g., the Internet) for facilitating communication between one or more of the system's various components. In one embodiment of the invention, the Transaction Confirmation Server 10 is configured for retrieving data from, and for saving data to, a database 15 that may be stored on (or, alternatively, stored remotely from) the Transaction Confirmation Server 10. In the embodiment shown in FIG. 1, the database 15 is maintained on a computer that is remote from the Transaction Confirmation Server 10. In a particular embodiment of the invention, the Transaction Confirmation Server 10 is also configured for communicating (either directly or indirectly) with one or more Portable Electronic Devices 40 (e.g., via an appropriate wireless network).

Figure 2:
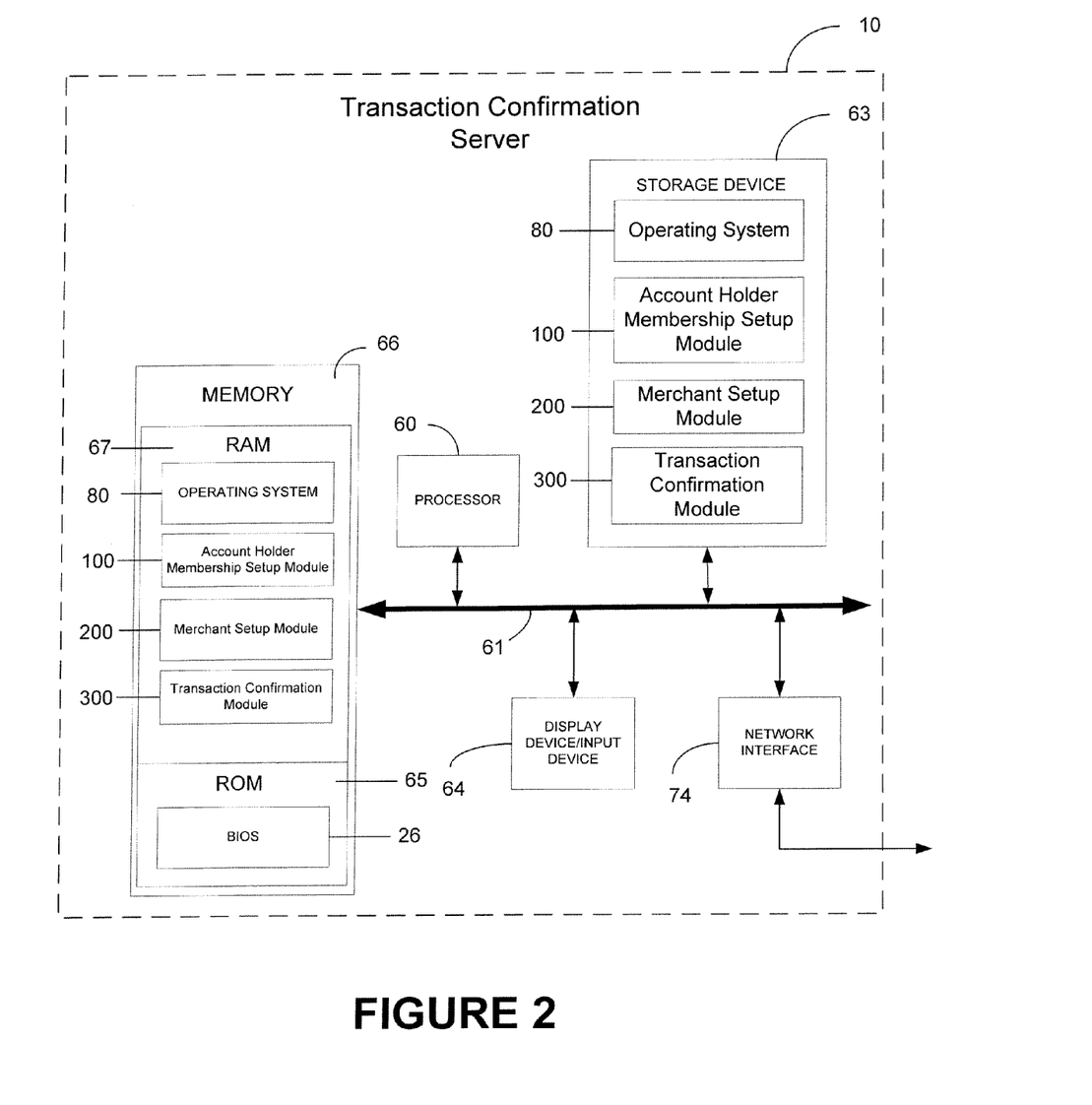
FIG. 2 is a diagram of a Transaction Confirmation Server according to one embodiment of the invention.

FIG. 2 shows a schematic diagram of a Transaction Confirmation Server 10 according to one embodiment of the invention. As may be understood from this figure, in this embodiment, the Transaction Confirmation Server 10 includes a processor 60 that communicates with other elements within the Transaction Confirmation Server 10 via a system interface or bus 61. Also included in the Transaction Confirmation Server 10 is a display device/input device 64 for receiving and displaying data. This display device/input device 64 may be, for example, a keyboard or pointing device that is used in combination with a monitor. The Transaction Confirmation Server 10 further includes memory 66, which preferably includes both read only memory (ROM) 65 and random access memory (RAM) 67. The server's ROM 65 is used to store a basic input/output system 26 (BIOS), containing the basic routines that help to transfer information between elements within the account administration server 20.

In addition, the Transaction Confirmation Server 10 includes at least one storage device 63, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 63 is connected to the system bus 61 by an appropriate interface. The storage devices 63 and their associated computer-readable media provide nonvolatile storage for a personal computer. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 67. Such program modules include an operating system 80, an Account Holder Membership Setup Module 100, a Merchant Setup Module 200, and a Transaction Confirmation Module 300. The Account Holder Membership Setup Module 100, Merchant Setup Module 200, and Transaction Confirmation Module 300 control certain aspects of the operation of the Transaction Confirmation Server 10, with the assistance of the processor 60 and an operating system 80.

Also located within the Transaction Confirmation Server 10 is a network interface 74, for interfacing and communicating with other elements of a computer network. It will be appreciated by one of ordinary skill in the art that one or more of the Transaction Confirmation Server 10 components may be located geographically remotely from other Transaction Confirmation Server 10 components. Furthermore, one or more of the components may be combined, and additional components performing functions described herein may be included in the Transaction Confirmation Server 10.

Operation of Transaction Processing System

The operation of various embodiments of the invention will now be discussed in greater detail. In particular, the Account Holder Membership Setup Module, the Merchant Setup Module, and the Transaction Confirmation Module are described in greater detail below.

Account Holder Membership Setup Module

In various embodiments of the invention, during the process of completing a transaction with a merchant (e.g., an on-line merchant) that is participating in a transaction confirmation service (e.g., via an appropriate web site), a user is provided the option of signing up for a membership in the service. In a particular embodiment, the user may sign up for this membership by clicking a link on the merchant's web site, which takes the user to a web site associated with the Transaction Confirmation Server 10. In various embodiments of the invention, the Transaction Confirmation Server 10 then runs an Account Holder Membership Setup Module 100. However, in alternative embodiments, the Account Holder Membership Setup Module 100 may be run on one or more other system components.

Figure 3:
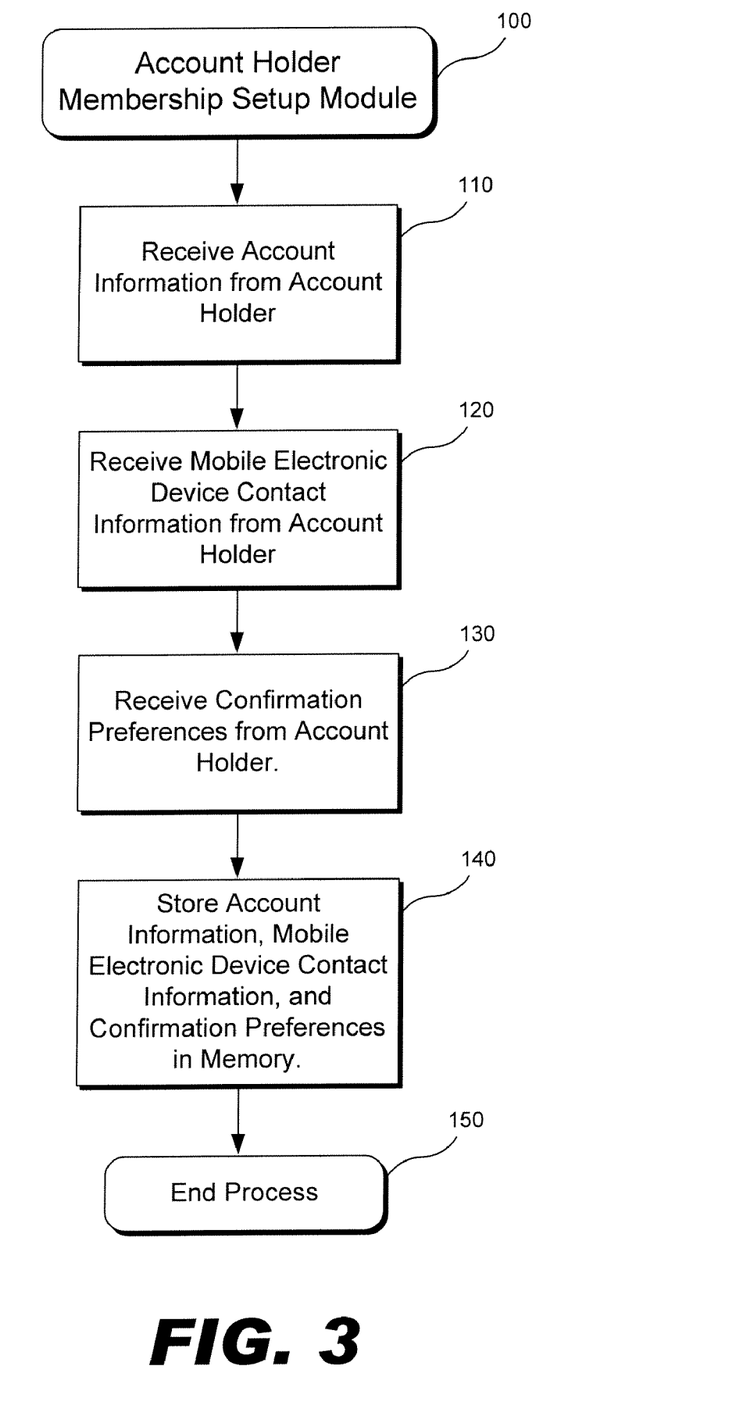
FIG. 3 is a flowchart of various steps executed within an Account Holder Membership Setup Module according to a particular embodiment of the invention.

An Account Holder Membership Setup Module 100 according to a particular embodiment of the invention is shown in FIG. 3. As may be understood from this figure, when executing the Account Holder Membership Setup Module 100, the system first advances to Step 110, where it receives account information from the user (e.g., the account holder). In various embodiments of the invention, the system receives this information (and/or one or more other types of information referenced herein) from the account holder as the account holder enters the information into the system via an appropriate web interface. However, this information may be received in any other appropriate manner (e.g., via an automated voice entry system, an automated attendant system, or manual entry by a customer service representative).

The account information received at Step 110 may include, for example, an account identifier (e.g., an account number) associated with an account (e.g., a credit card account, or bank account) that the account holder would like to have covered by the transaction confirmation service. The account information may also include, for example: (1) an account type associated with the account; (2) the account's expiration date; (3) a bank associated with the account; and/or (4) other pertinent account-related information.

Next, the system advances to Step 120, where it receives mobile electronic device contact information from the account holder (e.g., information that may be used to facilitate communication with one or more portable electronic devices). This information may include, for example, a cell phone number (e.g., the account holder's cell phone number), an e-mail address (e.g., the account holder's e-mail address), and/or an electronic device PIN number.

The system then proceeds to Step 130, where it receives confirmation preferences from the account holder. These confirmation preferences may, for example, define the circumstances under which transactions made via the specified account should be personally confirmed by the account holder or other designated individual. For example, the account holder may specify that any requested transaction over $100.00 (or any transaction made at a certain type of merchant) associated with the specified account should be personally confirmed with the account holder (or, alternatively, another designated individual—especially if the card holder is of high school or college age).

Furthermore, the confirmation preference information may optionally indicate the type of confirmation that should be required to personally confirm a transaction (e.g., as determined by the account holder). For example, in one embodiment, the account holder may specify that they wish to confirm a first specified type of transactions (e.g., purchase transactions under a specified dollar amount) by simply pressing a certain key (e.g., a "yes" key) on account holder's cell phone in response to receiving a "request for confirmation" SMS message on the account holder's cell phone. Alternatively, the card holder may specify that they wish to confirm a second specified type of transactions (e.g., purchase transactions over a specified dollar amount) by answering one or more questions regarding "out of wallet" data associated with the account holder. This may serve to provide an additional layer of security in confirming high-dollar purchase transactions, while providing additional convenience in approving low-dollar purchase transactions. Alternatively, the user may specify that they wish to confirm all transactions using the same method (e.g., by pressing a certain key on their cell phone in response to receiving a "request for confirmation" SMS message.) Next, after receiving the account information, mobile electronic device contact information, and confirmation preferences from the account holder (or other user), the system advances to Step 140 where it stores this information in the system's memory (e.g., in an appropriate database 15 associated with the Transaction Confirmation Server 10). Finally, the system advances to Step 150 where it ends execution of the Account Holder Membership Setup Module 100.

Merchant Setup Module

In particular embodiments of the invention, before being able to use a transaction confirmation service associated with the Transaction Confirmation Server 10, individual merchants must sign up for a particular transaction confirmation service. In various embodiments of the invention, this is done via a Merchant Setup Module such as the Merchant Setup Module 200 shown in FIG. 4. In various embodiments of the invention, the Merchant Setup Module 200 is executed by the Transaction Confirmation Server 10. However, in alternative embodiments, the Merchant Setup Module 200 may be executed by one or more of the system's other components.

Figure 4:
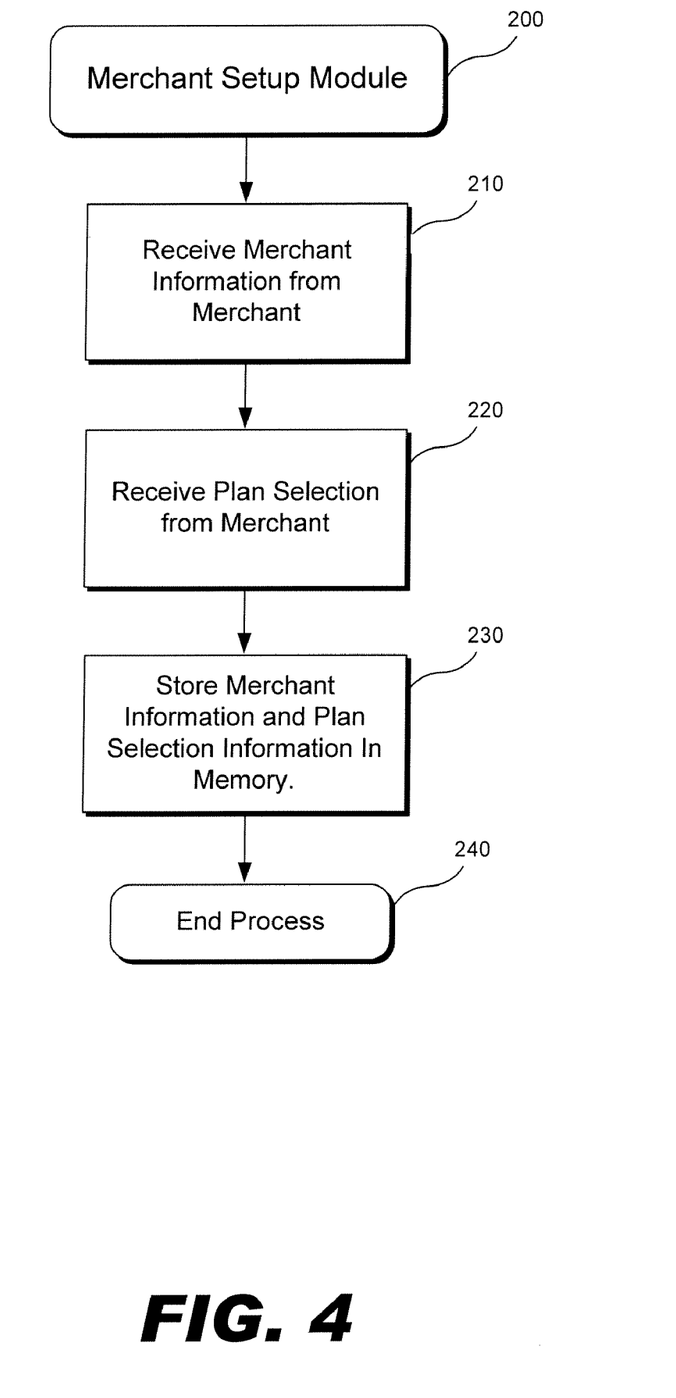
FIG. 4 is a flowchart of various steps executed within a Merchant Setup Module according to one embodiment of the invention.

Turning to FIG. 4, in various embodiments, when executing an exemplary Merchant Setup Module 200, the system first proceeds to Step 210 where it receives merchant information from the merchant who is signing up from the service. This information (and other information described herein) may be received, for example, via: (1) an appropriate web interface; (2) entry by a customer service representative; (3) an automated attendant; or (4) any other suitable method. The merchant information referenced in Step 210 may include, for example, the merchant's name, address, phone number, web site, type of business, and/or any other suitable information related to the merchant.

Next, the system advances to Step 220, where it receives an appropriate plan selection from the merchant. In various embodiments, under particular merchant plans, merchants are charged a predetermined amount for each transaction that is processed (e.g., confirmed or attempted to be confirmed) via the transaction confirmation system. In alternative embodiments, merchants may pay a flat rate for unlimited transaction confirmations.

Next, the system advances to Step 230 where it stores the merchant information and plan selection information received in Steps 210 and 220 in the system's memory (e.g., in a database 15 associated with the Transaction Confirmation Server 10). Finally, the system advances to Step 240 where it ends execution of the Merchant Setup Module 200.

In particular embodiments, the system may be adapted to allow one or more individual merchants (or other entities) to specify the circumstances under which transactions with the merchant, or other entity (e.g., purchase transactions with the merchant involving accounts registered with a particular transaction confirmation service) should be personally confirmed by the account holder or another designated individual. For example, the merchant may specify that any requested transaction with the merchant over $100.00 involving accounts registered with the transaction confirmation service should be personally confirmed by the account holder associated with the account at issue (or, alternatively, a designated individual other than the card holder—especially if the card holder is of high school or college age).

Furthermore, the merchant (or other entity) may optionally indicate the type of confirmation that should be required to personally confirm each transaction (or transactions satisfying certain specified criteria). For example, the merchant (or other entity) may indicate that the account holder should be required to confirm each transaction by answering a question regarding out-of-wallet (or in-wallet) data associated with the account holder or the account at issue. The system may be further configured to automatically facilitate confirmation of transactions according to the criteria specified by the merchant (or other entity) as described herein.

Transaction Confirmation Module

In various embodiments of the invention, once a particular merchant and account holder are set up to participate in the transaction confirmation service, in response to pre-determined criteria regarding a particular transaction being satisfied (e.g., pre-determined criteria specified by the account holder or merchant as described above), the system automatically facilitates confirmation of the transaction. For example, in one embodiment, if a user requests to pay for a particular purchase transaction using a specified account (e.g., the account specified by the account holder at Step 110 above) at a participating merchant (e.g., a retailer that is registered to participate in the transaction confirmation service), the merchant's computer system sends details of the requested transaction to a Transaction Confirmation Server 10 associated with the transaction confirmation service. The Transaction Confirmation Server 10 then executes a Transaction Confirmation Module 300, such as the Transaction Confirmation Module 300 shown in FIGS. 5A and 5B.

Figure 5A:
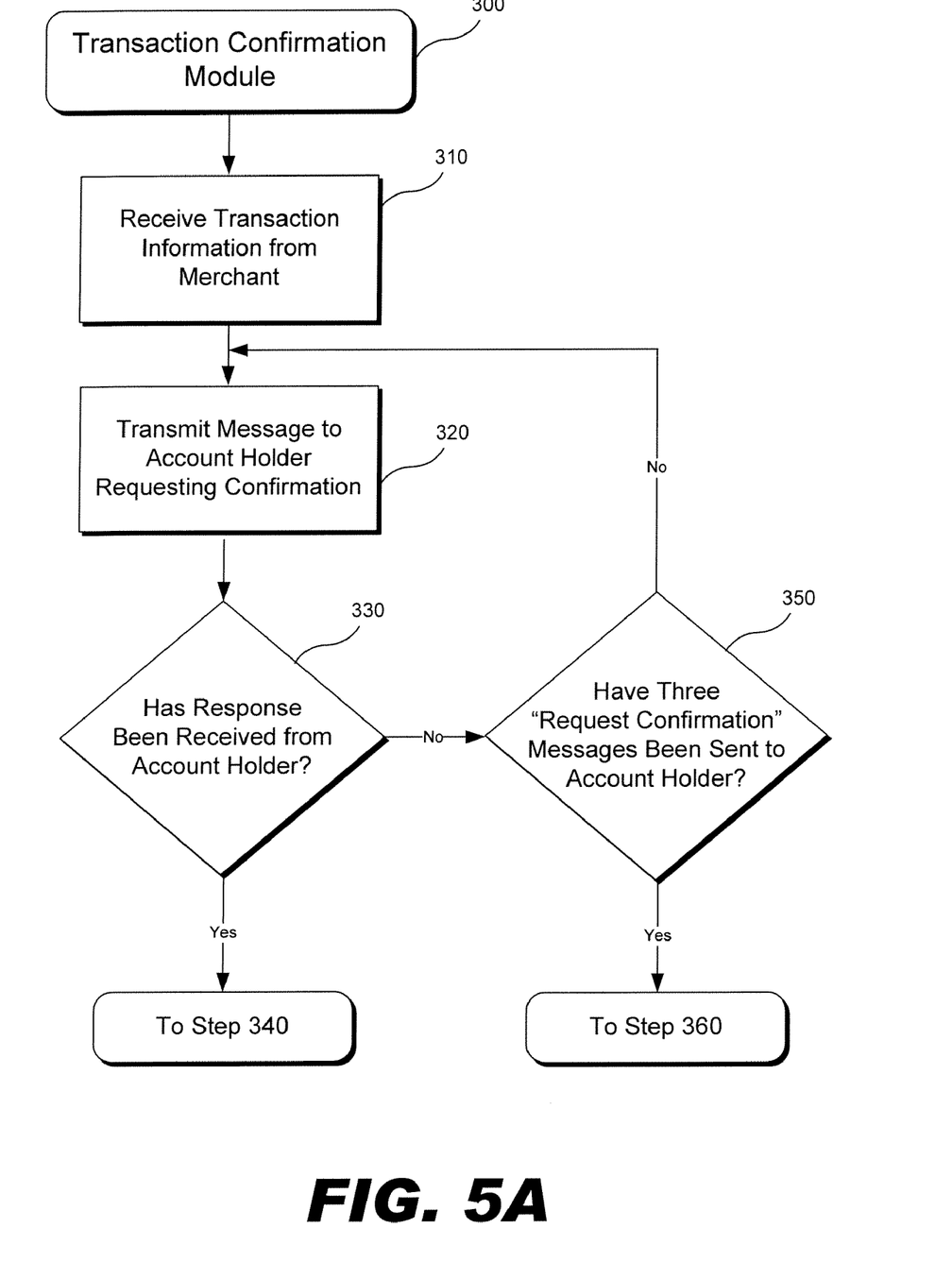
FIGS. 5A and 5B depict a flowchart of various steps executed within a Transaction Confirmation Module according to a particular embodiment of the invention.
Figure 5B:
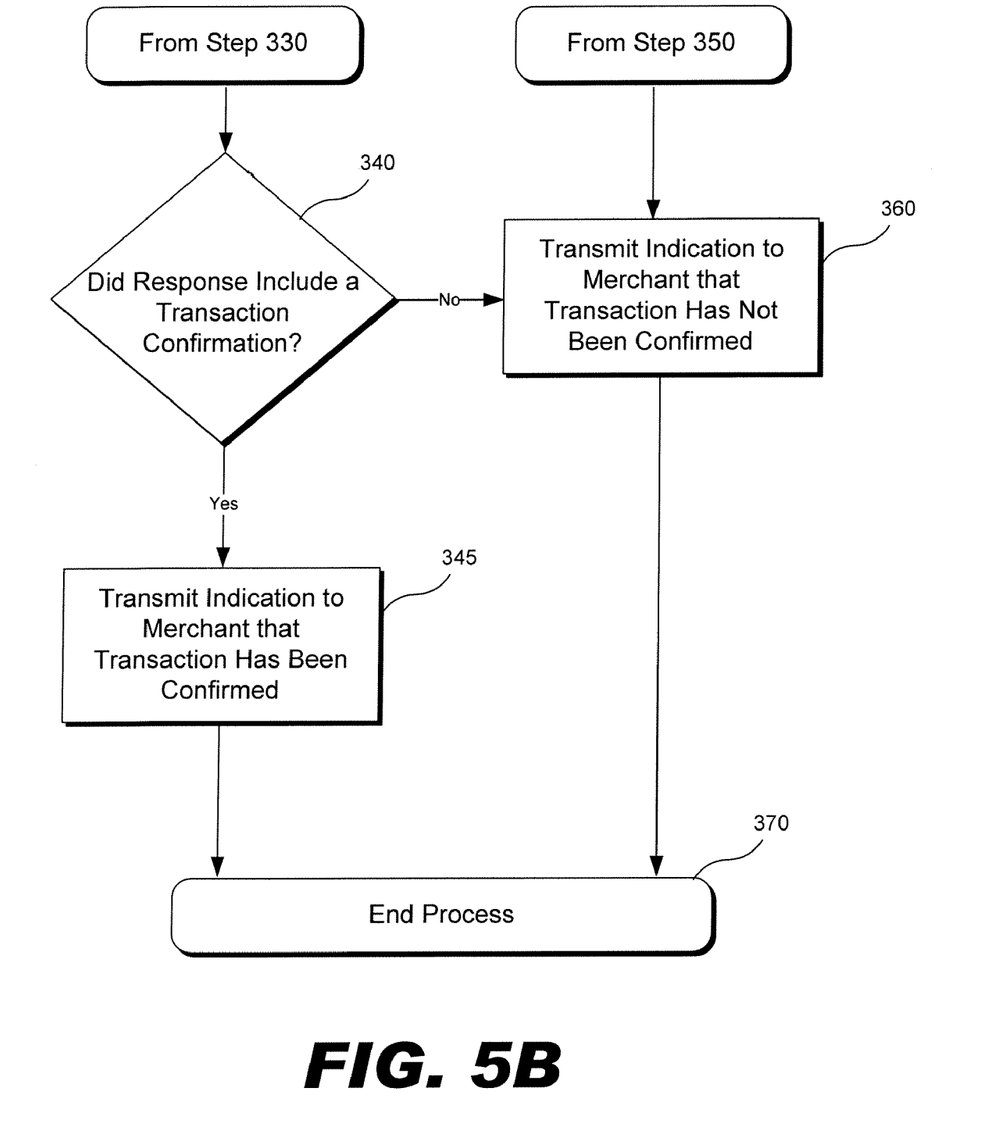

As may be understood from these figures, when executing an exemplary Transaction Confirmation Module 300, the system begins at Step 310 where it receives transaction information from a merchant with whom a request has been made to pay for a transaction using a particular account that has been registered with the transaction confirmation service. This transaction information may include, for example, one or more of the following types of information associated with the transaction: (1) an account number associated with the account from which payment has been requested; (2) the requested payment amount; (3) the name of the individual requesting the payment; (4) the merchant category code of the merchant involved in the transaction; (5) the type of goods or services involved in the transaction; and/or (6) any other suitable type of information associated with the transaction.

Figure 6:
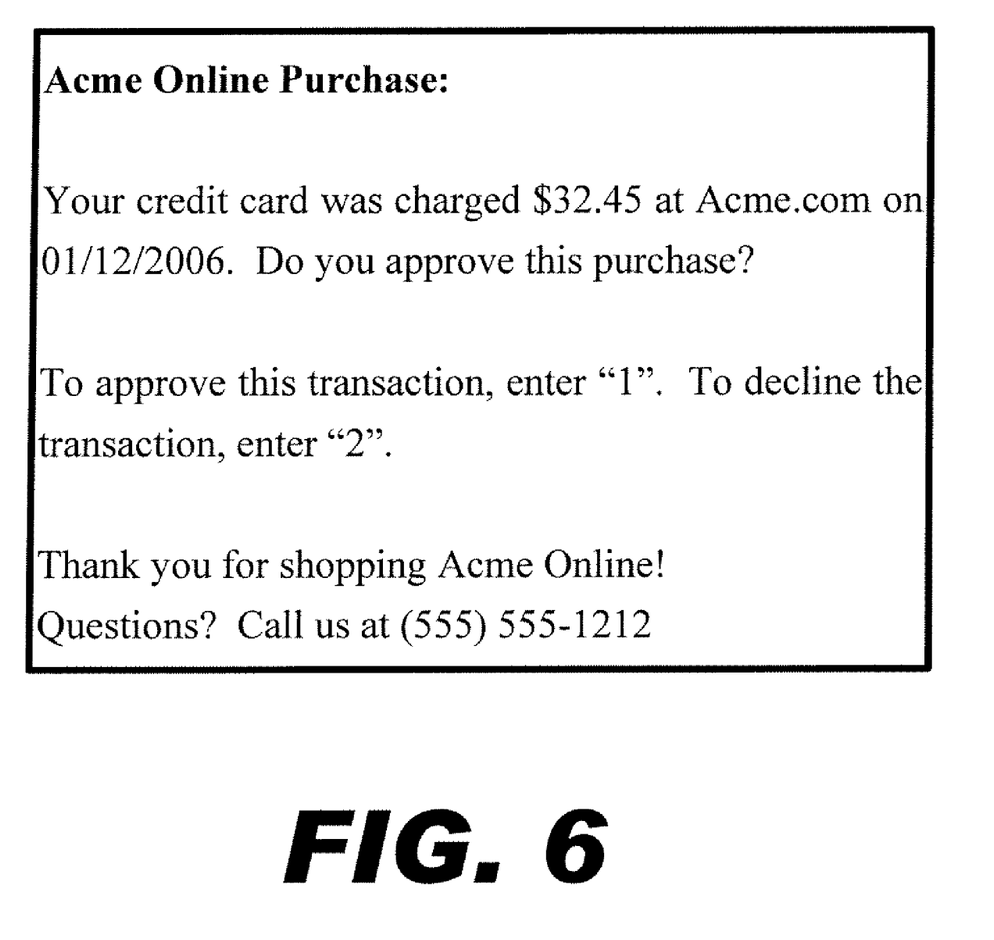
FIG. 6 is an exemplary SMS confirmation request message according to a particular embodiment of the invention.

Next, the system advances to Step 320 where it transmits a message to the account holder (or other individual who has been designated to confirm transactions associated with the particular account) requesting confirmation that the account holder or other designated individual approves the requested transaction. In various embodiments of the invention, this message is sent to an electronic device (e.g., a cellular phone) associated with the account holder (or other designated individual) in the form of an SMS message that is generated automatically (or substantially automatically) by the Transaction Confirmation Server 10. The system preferably uses the mobile electronic device contact information that the system received at Step 120 to facilitate transmission of the "confirmation request" message to the appropriate individual. An exemplary SMS "confirmation request" message is shown in FIG. 6.

In alternative embodiments of the invention, the system may transmit the message indicated at Step 320 in a format other than SMS. For example, the system may transmit the message in e-mail format, or in the form of an automated phone call to the account holder or other designated individual.

Next, the system advances to Step 330, where it determines whether the system has received a response to the message transmitted at Step 320 (e.g., from the Account Holder or other designated individual). In various embodiments, this response may be received, for example, via a return SMS message, return e-mail, a phone call, or any other suitable communication vehicle. In particular embodiments, if the system has not received a response after a pre-determined period of time (e.g., 30 seconds), the system proceeds to Step 350, where it determines whether the system has sent a pre-determined number (e.g., 3, 4, or 5) of "Request Confirmation" Messages (e.g., the messages transmitted at Step 320) to the account holder or other designated individual for the current transaction. If not, the system returns to Step 320 where it transmits another message to the account holder requesting confirmation of the requested transaction, and then proceeds as described above.

If, at Step 350, the system determines that it has already sent a pre-determined number (e.g., three) of "request confirmation" messages to the to account holder (or other designated individual), the system advances to Step 360, where it transmits an indication to the merchant (e.g., to the merchant's transaction processing computer system) indicating that the transaction has not been confirmed. The system then advances to Step 370, where it ends execution of the Transaction Confirmation Module 300. In response to receiving the message indicating that the transaction has not been confirmed, the merchant (e.g., the merchant's transaction processing server) may, for example: (1) automatically deny the transaction; or (2) attempt to contact the designated individual in another way before determining whether to approve or deny the transaction.

Returning to Step 330 in FIG. 5A, if the system determines that it has received a response from the account holder (or other designated individual), the system advances to Step 340 where it determines whether the response included in the confirmation that the account holder (or other designated individual) has confirmed the requested transaction. If so, the system advances to Step 345 where it transmits an indication to the merchant (e.g., the merchant's transaction processing system) that the transaction has been confirmed by the appropriate individual. The system then advances to Step 370, where it ends execution of the Transaction Confirmation Module 300. In response to receiving the message indicating that the transaction has been confirmed, the merchant (e.g., the merchant's transaction processing system) may, for example, automatically approve the transaction.

Returning to Step 340, if the response did not include a transaction confirmation, the system advances to Step 360 where it transmits an indication to the merchant (e.g., to the merchant's transaction processing system) indicating that the transaction has not been confirmed. The system then advances to Step 370, where it ends execution of the Transaction Confirmation Module 300. In response to receiving the message indicating that the transaction has not been confirmed, the merchant (e.g., the merchant's transaction processing system) may, for example: (1) automatically deny the transaction; or (2) attempt to contact the designated individual in another way before determining whether to approve or deny the transaction.

In particular embodiments, if the transaction processing system receives a response from the account holder (or other designated individual) specifically denying the transaction, the transaction processing system may send a message to the merchant (e.g., the merchant's transaction processing system) advising the merchant that the transaction has been denied. In response to receiving this information, the merchant's transaction processing system would then typically automatically deny the transaction.

The techniques described herein may also be used in the context of transactions other than purchases. For example, in various embodiments, the techniques described herein may be used to have the account holder (or other designated individual) confirm other types of transactions such as the opening of a new account (e.g., an on-line Bank account), or the transfer of funds from or to a particular account, such as a bank or credit account.

Confirmation Techniques Requiring Specific Data From the User

As noted above, in various embodiments of the invention, in order to properly confirm a transaction, the transaction processing system may require the account holder (or other designated individual) to provide data (such as data related to the account holder) as at least part of their response to the "request for confirmation" message transmitted at Step 320. This may serve as a further indicator that the individual providing confirmation of the transaction is the correct individual (and not an unauthorized person who is in possession of the electronic device to which the "request for confirmation" message of Step 320 was transmitted).

In particular embodiments of the invention, before generating and transmitting the "request for confirmation" message at Step 320, the Transaction Confirmation Server 10 may receive "out of wallet" data related to the account holder (or other designated individual), or other suitable data (e.g., "in wallet" data), from an appropriate source (e.g., from a database associated with the Transaction Confirmation Server or from a third party source). An appropriate third-party source may be, for example, a third party data provider such as Choice Point or a credit reporting agency such as Equifax or TransUnion.

In particular embodiments, as part of the "request for confirmation" message transmitted at Step 320, the system requests that the account holder (or other designated individual) answer a question regarding this "out of wallet" data (or, alternatively, "in wallet" data) as part of their response to the "request for confirmation" message. In particular embodiments, when determining, at Step 340, whether the account holder's (or other designated individual's) response includes a transaction confirmation, the system determines whether the response includes a correct answer to a question regarding the "out of wallet" data referenced above. If so, in various embodiments, the system determines that the response did include a transaction confirmation. If not, in particular embodiments, the system determines that the response did not include a transaction confirmation.

In various embodiments, if an account holder (or other designated individual) provides an incorrect answer to a question regarding the "out of wallet" data, or other suitable data, the system may return to Step 320 and transmit a new message to the account holder (or other designated individual) that includes a new question regarding the "out of wallet" data, or other suitable data. This may provide the account holder (or other designated individual) with another chance to confirm the transaction without having to submit a new transaction request. The system may be configured to provide the account holder (or other designated individual) with a pre-determined number of tries to answer these types of questions before sending the merchant an indication that the transaction has not been confirmed.

In other embodiments of the invention, rather than receiving data (e.g., "out of wallet" or "in wallet" data) from a third party and then using this data to confirm a particular transaction, the system may: (1) generate and transmit an appropriate "request for confirmation" message to the account holder (or other designated individual)—for example, via an SMS message; (2) after receiving a response to the "request for confirmation" message, transmitting the response to a third party data provider (e.g., a credit reporting agency), which then determines whether the response to the "request for confirmation" message is correct; and (3) receiving an indication from the third party data provider as to whether the response to the "request for confirmation" message is correct. The system may then use the indication from the third party as described above, or in another appropriate manner, to determine whether the transaction has been properly confirmed.

Confirmation Based on Multiple Factors

In various embodiments, the system may be configured to approve or deny (or to recommend approving or denying) a particular transaction based one or more of a variety of different factors. Such factors include, for example, (1) a geographical location associated with a particular electronic device (as determined by an IP Address associated with the electronic device); (2) user responses to questions regarding out-of-wallet data associated with a particular account, account holder, or other individual (which may be obtained, for example, as described above); and (3) user responses to questions regarding in-wallet data associated with a particular account, account holder, or other individual (which may be obtained, for example, as described above).

Also, in particular embodiments, the system may be adapted to use these factors (or other suitable factors) to assess the relative risk associated with a particular transaction and, optionally, to associate this assessed relative risk (e.g., low, medium, or high risk) with the particular transaction. For example, the system may be configured to assign a "low risk" transaction rating to transactions in which: (1) the system received a correct response from an account holder to a question regarding "out of wallet" data associated with the account holder; and (2) the IP address associated with a particular computer (e.g., a computer from which the system received the correct response to the question) is associated with a "low risk" geographical location (e.g., a geographical location with a relatively low crime rate). As a further example, the system may be configured to assign a "medium risk" transaction rating to transactions in which: (1) the system received a correct response from an account holder to a question regarding "out of wallet" data associated with the account holder; and (2) the IP address associated with a particular computer (e.g., a computer from which the system received the correct response to the question) is associated with a "high risk" geographical location (e.g., a geographical location with a relatively high crime rate).

In particular embodiments, the system may be configured to transmit the transaction risk rating (determined, for example, as described above) to a payment processing system, which may then use the risk rating to determine how much to charge for processing payment for the particular transaction. For example, the payment processing system may charge a first rate for processing "low risk" transactions, a second (e.g., higher) rate for processing "medium risk" transactions, and a third (e.g., highest) rate for processing "high risk" transactions.

Confirmation by Specified Third Party

As noted above, in some circumstances, it may be desirable to have an individual other than the account holder determine whether to confirm that a particular requested transaction should be processed. For example, this may be particularly useful if the account at issue is a credit card account that has been cosigned by the parents of the account holder (who may be, for example, a college student). In this case, the transaction confirmation system may be set up to, at Step 320, transmit a message to one of the account holder's parents (e.g., via the parent's cell phone) requesting confirmation of transactions involving the specified account.

In various embodiments, the system may be configured, for example, to request confirmation from an individual other than the account holder: (1) for all requested transactions; (2) for all requested transactions over a pre-determined monetary amount; (3) for all requested transactions with a particular type of merchant (which may be determined, for example, by the merchant's merchant category code); and/or (4) for all purchases of a particular type of item (e.g., clothing or alcohol). In particular embodiments, the system may be configured to, at Step 320, request confirmation: (1) from a first individual (e.g., from the account holder's parent via an electronic device associated with the account holder's parent) if predetermined conditions (such as those specified above) are satisfied; and (2) from a second individual (e.g., from the account holder via an electronic device associated with the account holder) if the predetermined conditions aren't satisfied.

Channel Authentication

In various embodiments of the invention, the system may use any of the techniques described herein (or similar techniques) to authenticate a particular channel of communication with the account holder or other designated individual (e.g., a cellular phone). For example, the system may be adapted to, in response to an individual (e.g., an account holder) setting up a membership in a particular account confirmation service: (1) automatically transmitting a message to the account holder, via the particular channel of communication (e.g., the account holder's cellular phone), requesting that the account holder confirm that the communication channel is functioning properly by responding to the message (e.g., in a particular manner described within the message); (2) receiving, from the individual, a response to the message; (3) using a response to the message to determine whether to authenticate the particular channel of communication; (4) in response to determining to authenticate the particular channel of communication, authenticating the particular channel of communication; and (5) in response to determining not to authenticate the particular channel of communication, not authenticating the particular channel of communication. In various embodiments of the invention, the message to the individual and/or the individual's response is an SMS message. Also, in particular embodiments, the message to the individual may include a question (e.g., regarding "out of wallet" or "in wallet" data associated with the individual), the individual's response may include a response to this question, and the system may be adapted to determine whether the communication channel has been properly authenticated based, at least in part, to the individual's response to the question.

In alternative embodiments, the system may authenticate a particular channel of communication upon the occurrence of an event other than the setup of a membership in a particular account confirmation service. For example, the system may authenticate a particular channel of communication upon a first transaction made using a particular account after the particular account has been registered in the account confirmation service as part of a setup of a membership in the account confirmation service.

Account Administration

Membership Administration

In various embodiments of the invention, the system may be adapted to allow users (e.g., account holders or other designated individuals) to change various aspects of the account holder's membership without (or substantially without) human assistance. For example, the system may allow a user to access the system via a particular web site, and to use this web site to modify information regarding the account holder's membership. For example, in various embodiments, the user may use a Membership Administration web site to: (1) modify the account holder's current account number; (2) modify the mobile electronic device contact information associated with the account holder's account; (3) change the confirmation rules associated with the membership (e.g., the conditions under which the account holder, or other designated individual, will be required to confirm transactions involving the account, and/or the conditions under which an individual other than the account holder will be required to confirm transactions); and/or (4) view pertinent information related to the account holder's membership.

Merchant Administration

Figure 7:
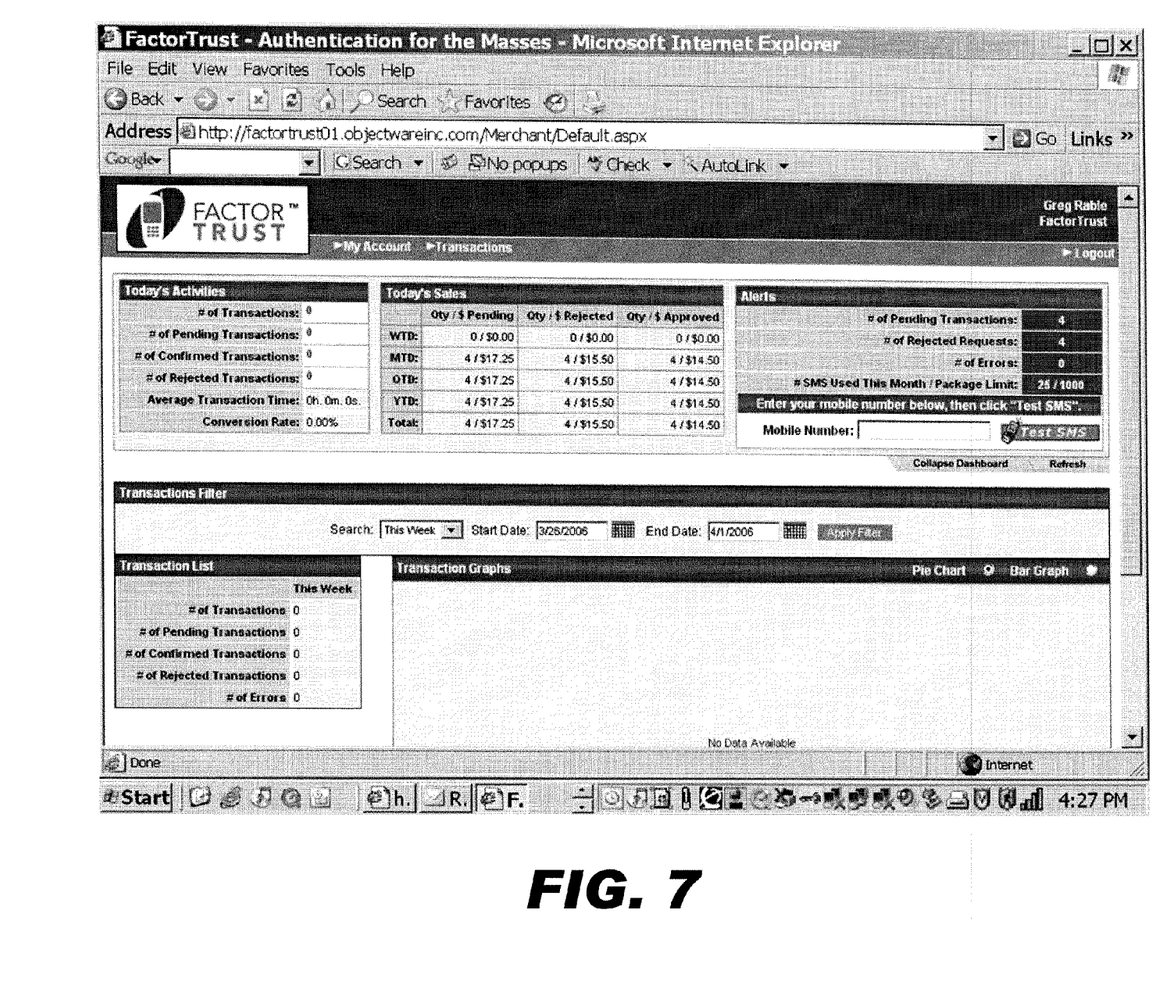
FIG. 7 is an exemplary merchant information screen according to one embodiment of the invention.

Similarly, in various embodiments of the invention, the system may be adapted to allow merchants to change various aspects of the merchant's account without (or substantially without) human assistance. For example, the system may allow a merchant to access the system via a particular web site, and to use this web site to modify information regarding the merchant's account. For example, in various embodiments, the user may use a Merchant Administration web site to: (1) modify the merchant's current transaction confirmation plan and/or (2) modify the merchant's contact information. The web site may also display, or otherwise provide, information related to the merchant's account. Such information may include, for example: (1) the number of transactions confirmed within a particular period of time; (2) the average amount of time required to confirm the transactions; (3) the merchant's account balance; (4) change the confirmation rules associated with merchant (e.g., the conditions under which registered account holders, or other designated individuals, will be required to confirm transactions involving the merchant) and/or (5) any other pertinent information related to the merchant's account. An exemplary merchant information screen is shown in FIG. 7.

CONCLUSION

Many modifications and other embodiments of the invention will come to mind to one skilled in the art to which this invention pertains having the benefit of the teachings presented in the foregoing descriptions and the associated drawings. Accordingly, it should be understood that the invention is not to be limited to the specific embodiments disclosed and that modifications and other embodiments are intended to be included within the scope of the appended exemplary concepts. Although specific terms are employed herein, they are used in a generic and descriptive sense only and not for the purposes of limitation.

I claim:

1. A transaction processing system comprising:
   a computer processor; and
   memory for storing computer-readable instructions to be executed by said computer processor, wherein:
   said transaction processing system is adapted for:
      transmitting a transaction confirmation message to an electronic device to confirm a particular transaction;
      receiving a response to said transaction confirmation message from said electronic device;
      assigning a transaction risk rating to said particular transaction based, at least in part, on at least one factor selected from a group consisting of: (A) a geographical location associated with said electronic device; and (B) said response to said transaction confirmation message; and
      using said transaction risk rating to determine an amount to charge for processing said particular transaction.

2. The transaction processing system of claim 1, wherein said step of using said transaction risk rating to determine an amount to charge for processing said particular transaction comprises:
   in response to determining that said particular transaction has been assigned a first transaction risk rating, determining to charge a first particular amount for processing said particular transaction; and
   in response to determining that said particular transaction has been assigned a second transaction risk rating, determining to charge a second particular amount for processing said particular transaction.

3. The transaction processing system of claim 1, wherein said transaction processing system is adapted for assigning a transaction risk rating to said particular transaction based, at least in part, on said geographical location associated with said electronic device.

4. The transaction processing system of claim 1, wherein said transaction processing system is adapted for assigning a transaction risk rating to said particular transaction based, at least in part, on said response to said transaction confirmation message.

5. A transaction processing system comprising:
   a computer processor; and
   memory for storing computer-readable instructions to be executed by said computer processor, wherein:

said transaction processing system is adapted for:
  transmitting a transaction confirmation message to an electronic device to confirm a particular transaction;
  receiving a response to said transaction confirmation message from said electronic device;
  assigning a transaction risk rating to said particular transaction based, at least in part, on at least one factor selected from a group consisting of: (A) a geographical location associated with said electronic device; and (B) said response to said transaction confirmation message; and
  transmitting said transaction risk rating to a payment processing system that is adapted for using said transaction risk rating to determine an amount to charge for processing said particular transaction.

6. The transaction processing system of claim 5, wherein:
said electronic device is associated with a particular account holder;
said transaction processing system is further adapted for:
  receiving transaction information related to said particular transaction, said particular transaction being associated with a particular account of said particular account holder;
  receiving, from a third party, account holder information related to said account holder;
  at least partially in response to receiving said transaction information, transmitting a message to said electronic device associated with said account holder, said message requesting a response indicating knowledge of said account holder information;
  after said step of transmitting a message to an electronic device associated with said account holder, receiving said response to said transaction confirmation message from said electronic device;
  determining whether said response to said transaction confirmation message indicates knowledge of said account holder information;
  at least partially in response to determining that said response to said transaction confirmation message indicates knowledge of said account holder information, communicating that said transaction should be approved; and
  at least partially in response to determining that said response to said transaction continuation message indicates a lack of knowledge of said account holder information, communicating that said transaction should be denied.

7. The transaction processing system of claim 6, wherein:
said step of receiving transaction information comprises receiving said transaction information from a merchant server, said merchant server being associated with a merchant participating in said transaction; and
said step of communicating that said transaction should be approved comprises communicating, to said merchant server, that said transaction should be approved.

8. The transaction processing system of claim 7, wherein:
said step of communicating that said transaction should be denied comprises communicating, to said merchant server, that said transaction should be denied.

9. The transaction processing system of claim 6, wherein said step of communicating that said transaction should be approved comprises transmitting an indication to a server that said transaction should be approved, said server being remote from said transaction processing system.

10. The transaction processing system of claim 6, wherein said step of communicating that said transaction should be denied comprises transmitting an indication to a server that said transaction should be denied, said server being remote from said transaction processing system.

11. The transaction processing system of claim 6, wherein:
said particular transaction is a credit card transaction; and
said particular account is a credit card account.

12. The transaction processing system of claim 6, wherein said third party is a third party customer data provider.

13. The transaction processing system of claim 12, wherein said third party is a credit reporting agency.

14. The transaction processing system of claim 6, wherein said message is an SMS message.

15. The transaction processing system of claim 6, wherein said message is an e-mail.

16. The transaction processing system of claim 6, wherein said account holder information is out-of-wallet data.

17. The transaction processing system of claim 16, wherein said third party is a credit reporting agency.

18. The transaction processing system of claim 16, wherein:
said message comprises a question regarding said out-of-wallet data; and
said response indicating knowledge of said account holder information is a correct answer to said question.

19. The transaction processing system of claim 16, wherein:
said message is effective to ask that a particular piece of out-of-wallet information be provided; and
said response indicating knowledge of said account holder information comprises said particular piece of out-of-wallet information.

20. The transaction processing system of claim 6, wherein said electronic device is a cell phone.

21. The transaction processing system of claim 5, wherein said transaction processing system is further adapted for:
at least partially in response to determining that said response to said transaction confirmation message from said electronic device indicates knowledge of said account holder information, approving said transaction.

22. The transaction processing system of claim 5, wherein said transaction processing system is further adapted for:
at least partially in response to determining that said response to said transaction confirmation message indicates knowledge of said account holder information, denying said transaction.

23. The transaction processing system of claim 5, wherein:
said electronic device is associated with a designated transaction approver;
said transaction processing system is further adapted for, prior to said step of transmitting said transaction confirmation message, receiving transaction information related to said particular transaction, said particular transaction being associated with a particular account of a particular account holder;
said step of transmitting said transaction confirmation message to said electronic device is done at least partially in response to receiving said transaction information;
said step of receiving said response to said transaction confirmation message is done after said step of transmitting said transaction confirmation message to said electronic device;
said transaction processing system is further adapted for:
  (A) in response to said response from said electronic device associated with said designated transaction approver indicating that said transaction should be approved, approving said transaction; and (B) in response to said response from said electronic device associated with said designated transaction approver indicating that said transaction should be denied, denying said transaction; and said designated transaction approver is someone other than said account holder.

24. The transaction processing system of claim 23, wherein said message comprises a monetary amount associated with said transaction.

25. The transaction processing system of claim 23, wherein:
said transaction is a purchase of an item from a retailer; and
said message comprises the name of said retailer.

26. The transaction processing system of claim 23, wherein:
said transaction is a purchase of an item from a retailer; and
said message comprises a description of said item.

27. The transaction processing system of claim 23, wherein said transaction approver is a parent of said account holder.

28. The transaction processing system of claim 5, wherein:
said transaction processing computer system is further adapted for:
  receiving an order from a customer, said order being made in conjunction with said particular transaction;
  receiving an indication that said customer wishes to pay for said order using a particular account;
  determining whether said particular account has been enrolled in a particular order confirmation plan, wherein said steps of receiving an order, receiving an indication, and determining whether said account has been enrolled in said order confirmation plan occur prior to said step of transmitting said transaction confirmation message;
  receiving said response to said transaction confirmation message from said electronic device after said step of transmitting said transaction confirmation message;
  at least partially in response to determining that said particular account has been enrolled in said particular order confirmation plan:
    (a) identifying a phone number that has been associated with said particular account;
    (b) automatically transmitting said transaction confirmation message to said account holder, via said phone number, said transaction confirmation message requesting that said account holder confirm said order;
    (c) using said response to said transaction confirmation message to determine whether to approve or deny payment for said order;
    (d) in response to determining to approve payment for said order, approving payment for said order; and
    (e) in response to determining to deny payment for said order, denying payment for said order; and
  at least partially in response to determining that said particular account has not been enrolled in said particular order confirmation plan, approving payment for said order without requesting that said account holder confirm said order.

29. The transaction processing system of claim 28, wherein said step of identifying a phone number that has been associated with said particular account comprises identifying a phone number that has been associated with said particular account in conjunction with said order confirmation plan.

30. The transaction processing system of claim 29, wherein:
said step of determining whether said particular account has been enrolled in a particular order confirmation plan comprises receiving information from an order confirmation plan server indicating whether said particular account has been enrolled in said particular order confirmation plan; and
said order confirmation plan server is remote from said transaction processing system.

31. The transaction processing system of claim 28, wherein said message is an SMS message.

32. The transaction processing system of claim 5, wherein:
said transaction confirmation message comprises a question regarding out-of-wallet data; and
said response to said transaction confirmation message comprises an answer to said question.

33. The transaction processing system of claim 5, wherein said payment processing system is further adapted for:
determining to charge a first particular amount for processing said particular transaction in response to determining that said particular transaction has been assigned a first transaction risk rating; and
determining to charge a second particular amount for processing said particular transaction in response to determining that said particular transaction has been assigned a second transaction risk rating.

34. The transaction processing system of claim 5, wherein said transaction processing system is adapted for assigning a transaction risk rating to said particular transaction based, at least in part, on said geographical location associated with said electronic device.

35. The transaction processing system of claim 5, wherein said transaction processing system is adapted for assigning a transaction risk rating to said particular transaction based, at least in part, on said response to said transaction confirmation message.

* * * * *

UNITED STATES PATENT AND TRADEMARK OFFICE
CERTIFICATE OF CORRECTION

| | | |
|---|---|---|
| PATENT NO. | : 7,331,518 B2 | |
| APPLICATION NO. | : 11/278612 | |
| DATED | : February 19, 2008 | |
| INVENTOR(S) | : Rable | |

It is certified that error appears in the above-identified patent and that said Letters Patent is hereby corrected as shown below:

Column 8,
Line 66, "oft he" should read --of the--.

Column 15, Claim 6
Line 44, "continuation" should read --confirmation--.

Signed and Sealed this
Fifth Day of July, 2011

David J. Kappos
*Director of the United States Patent and Trademark Office*